United States Patent [19]

Kim

[11] Patent Number: 5,278,485
[45] Date of Patent: Jan. 11, 1994

[54] CONTROL CIRCUIT FOR INDUCTION MOTOR

[75] Inventor: Dong-Il Kim, Seoul, Rep. of Korea

[73] Assignee: Samsung Electronics Co., Ltd., Suwon, Rep. of Korea

[21] Appl. No.: 943,549

[22] Filed: Sep. 11, 1992

[30] Foreign Application Priority Data

Sep. 18, 1991 [KR] Rep. of Korea ............ 91-16322

[51] Int. Cl.$^5$ .............................................. H02P 5/40
[52] U.S. Cl. ................................... 318/802; 318/809; 388/906
[58] Field of Search .............. 318/800, 803, 805, 802, 318/809, 811, 808; 388/906

[56] References Cited

U.S. PATENT DOCUMENTS

| | | | | |
|---|---|---|---|---|
| 4,023,083 | 5/1977 | Plunkett | ............................ | 318/803 |
| 4,215,305 | 7/1980 | D'Atre et al. | ........................ | 318/808 |
| 4,310,791 | 1/1982 | Akamatsu | ........................... | 318/808 |
| 4,456,868 | 6/1984 | Yamamura et al. | ................. | 318/800 |
| 4,469,997 | 9/1984 | Curtiss et al. | ........................ | 318/805 |
| 4,617,675 | 10/1986 | Ashikaga et al. | .................... | 318/811 |
| 4,751,447 | 6/1988 | Okachi | ................................ | 318/768 |
| 4,885,520 | 12/1989 | Sugimoto et al. | ................... | 318/805 |
| 4,967,135 | 10/1990 | Ashikaga et al. | .................... | 318/808 |

FOREIGN PATENT DOCUMENTS 57-180387 11/1982 Japan.

Primary Examiner—William M. Shoop, Jr.
Assistant Examiner—John W. Cabeca
Attorney, Agent, or Firm—Burns, Doane, Swecker & Mathis

[57] ABSTRACT

A control circuit for an induction motor calculates the d-axis current and q-axis current of a rotor in the motor and estimates the variation of the flux and resistance of the rotor on the basis of the d-q axis currents. As a result, a three-phase current for compensating for the resistance of the rotor varied due to the temperature and environment is suitably controlled to obtain high-performance of the motor.

1 Claim, 2 Drawing Sheets

CONTROL CIRCUIT FOR INDUCTION MOTOR

BACKGROUND OF THE INVENTION

1. Field of the Invention

The present invention relates to a control circuit for an induction motor, more particularly, to a control circuit for an induction motor which estimates resistance of a rotor in the motor and controls three-phase current supplied to the motor to obtain a dynamic high performance characteristic of the motor.

For example, such a control circuit for an induction motor is well-known in Japanese patent laid-open publication No. Sho 57-180387. The control circuit proposed in the publication comprises a variable voltage/variable frequency controller (VVVF) arranged at the side of the power supply of an induction motor IM, a velocity operator SOP obtains a difference between a velocity signal NF designating the rotating velocity of the motor IM, detected by a velocity generator TG and a velocity command signal NR, a current operator IOP obtains current value of the motor IM on the basis of the induced current signal I2 from the velocity operator SOP and an exciting current IO and controls the output voltage of the variable voltage/variable frequency controller VVVF by using the current value, an adder ADD adds the velocity signal NF and an effective current I2 outputted from the velocity operator SOP and controls the output frequency of a voltage frequency converter VFC having its output supplied to a frequency controller FCT, a comparator CP feeds a primary current signal IF back to the velocity operator SOP in accordance with the output signal of a polarity detector PD when the primary current IF flowing through a rectifier REC, detected by a current transformer CT disposed at the output side of the variable voltage/variable frequency controller VVVF, is larger than the previously set value, a differentiator DF differentiates the output of the adder ADD and feeds the differentiated result back to the velocity operator SOP. An operator OP operates the primary current signal IF flowing through the rectifier REC and the output signal of the current operator IOP and supplies the operated result to a voltage controller VCT producing a voltage control signal to be supplied to the variable voltage/variable frequency controller VVVF, as shown in FIG. 1.

With the controller circuit for the induction motor thus constructed, the motor is controlled such that it is rotated with a predetermined slip in accordance with a frequency of a power supply voltage. Accordingly, when the velocity of the motor IM is changed for an acceleration or deceleration, it is difficult to maintain the slip constantly. Furthermore, during a change in the velocity, the slip varies and the rotating velocity of the motor IM is also unsuitable.

To solve the drawbacks, a vector control technique is considered.

According to the vector control technique, a slipping angular velocity must be operated when inputting a synchronous angular velocity. Therefore, if parameter a which is greatly variable depending on the variation of temperature, such as a rotating resistance of the motor IM, is employed for operating the slipping angular velocity, then the amount of slip is operated incorrectly. As a result, there is a problem in that efficiency of the motor IM cannot be normally assured.

SUMMARY OF THE INVENTION

Accordingly, an object of the present invention is to provide a control circuit for an induction motor, which estimates an amount of resistance of a rotor to be varied depending on the temperature, and controls a current supplied to the motor, thereby preventing control performance from being reduced due to the variation of the resistance of the rotor.

To achieve the above object of the present invention, there is provided a control circuit for an induction motor, comprising: a phase converter for converting a three-phase current supplied to a stator of the motor into d-q axis currents ids and iqs; a rotor flux estimating portion for receiving the current ids of the d axis outputted from the current phase converter and for estimating flux of the rotor; and a counter for counting the output pulses of a pulse generator producing the pulse proportional to the number of revolutions of the motor also includes is a first PI (proportional-integral) controller for proportionally and integrally controlling the output value e1 obtained by adding the present velocity Wr from the counter and the normal velocity command value Wr* of the rotor by way of a summer; a second PI controller is included for proportionally and integrally controlling the output value e2 obtained by summing the output of a multiplier and the output signal of the first PI controller to control a torque of the motor, the multiplier multiplies the output signal of the rotor flux estimating portion and the current iqs of the q axis to obtain the torque of the motor further there is a third PI controller for proportionally and integrally controlling the output value e3 obtained by summing the output signal of the rotor flux estimating portion and the normal flux command value $\phi dr^*$ by a summer; and a fourth PI controller for proportionally and integrally controlling the output value e4 obtained by summing the output signal of the third PI controller and the current signal of the d axis by a summer G4; and a divider for dividing the current iqs of the q axis by the output value of the rotor flux estimating portion additionally, there is a slip resistance calculator for receiving the output of the divider and the output of the rotor resistance estimating portion as input signals and for calculating the slip resistance; and a rotor resistance estimating portion for receiving a synchronous angular velocity Ws as an output of a summer for summing the slip angular velocity Ws1 from the slip resistance calculator and the velocity Ws1, the normal velocity command value Wr*, the normal flux command value, and the output signals of the second and fourth PI controllers and estimate the variation of the rotor resistance. Also included in a ROM-table for converting an axis fixed to a stator axis into the d-q axis to be rotated at an arbitrary synchronous angular velocity and for converting the d-q axis rotated with the arbitrary synchronous angular velocity into the axis fixed to the stator axis using the output of an integrator for integrating the synchronous angular velocity Ws from the summer as an address signal; and a controller for receiving the outputs of the second and fourth PI controllers and outputting the stator voltages Vds and Vqs of the d-q axis by controlling the flux and velocity of the rotor. Further included is a 2$\phi$-3$\phi$ phase converter for converting the output of the controller into a motor phase-voltage command value in accordance with the values sin$\theta$ and cos$\theta$ outputted from the ROM table; and, an inverter for driving the motor by using the phase voltage command value supplied from the 2φ-3φ phase converter.

The above and other objects and features of the invention will be described with reference to the accompanying drawings.

DETAILED DESCRIPTION OF THE INVENTION

Figure 1:
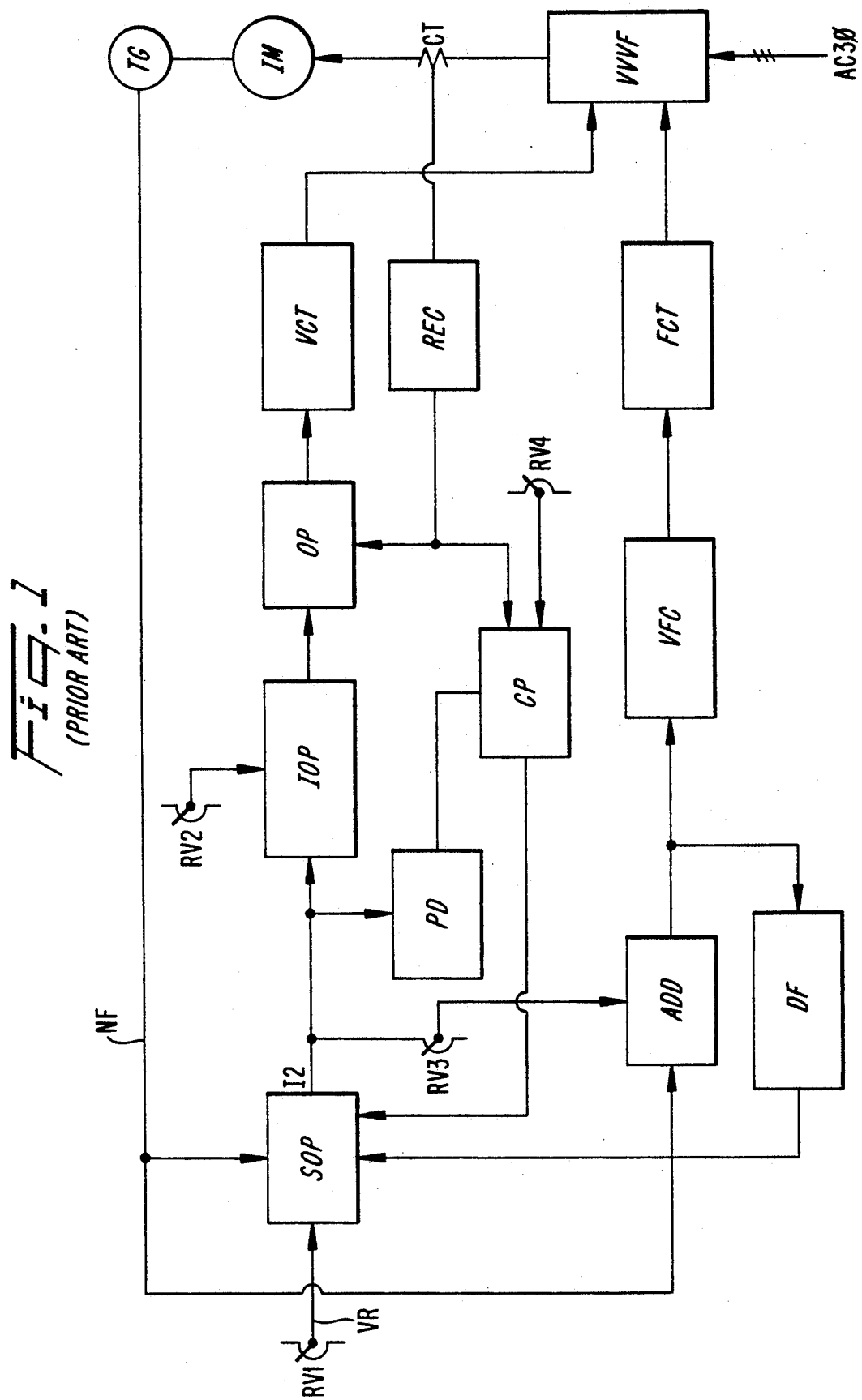
FIG. 1 is a block diagram of a conventional control circuit for an induction motor; and, FIG. 2 is a block diagram of a control circuit for an induction motor according to the present invention.

Thereinafter, a preferred embodiment of the present invention will be described in detail with reference to the drawing.

Figure 2:
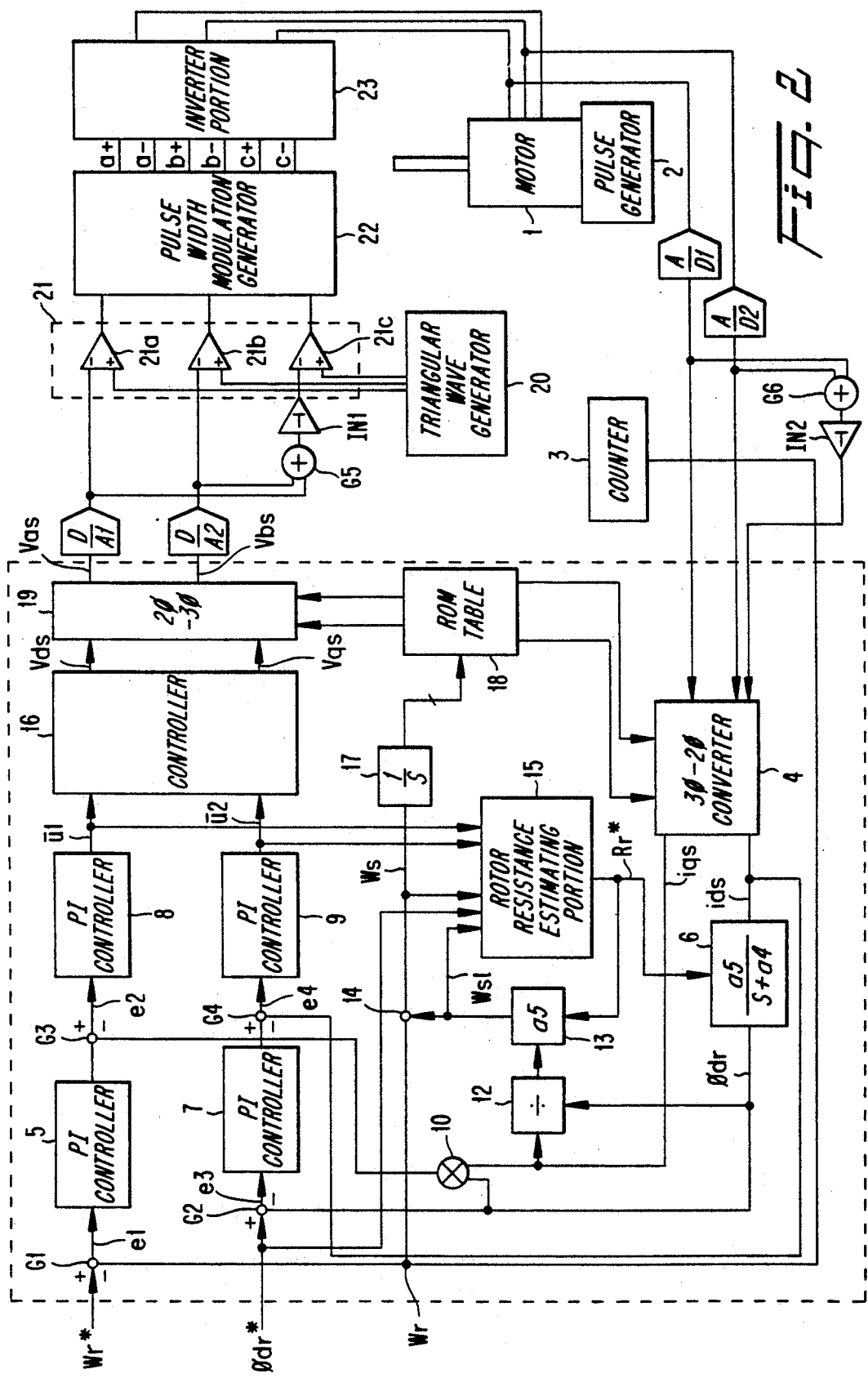

FIG. 2 is a block diagram of a control circuit for an induction motor according to the present invention.

Referring to FIG. 2, a current phase converter 4, converts three-phase current of the induction motor 1 which is digitized by analog to digital (A/D) converters into the current ids and iqs of d-q axis. A rotor flux estimating portion 6 is automatically controlled by an estimated resistance Rr* outputted from the rotor resistance estimating portion 15 obtaining the flux of the rotor from the current ids of the d axis produced by the current phase converter 4. Further, a counter 3 counts the output pulses of a pulse generator 2 which generates pulses proportional to the number of rotations of the induction motor 1 to detect the rotating velocity Wr of the induction motor 1 a first PI (proportional-integral) controller 5 proportionally and integrally controls the output value e1 obtained by summing the present rotating velocity value Wr from the counter 3 and the normal rotator command value Wr* by a summer G1. A second PI controller 8 proportionally and integrally controls the output value e2 obtained from a summer G3 by summing the output signal of the first PI controller 5 and the output of a multiplier 10 which multiplies the output signal of the rotator flux estimating portion 6 and the current iqs of the q axis to produce a torque of the induction motor 1.

In addition, a third PI controller 7 proportionally and integrally controls the output value e3 produced from a summer G2 which sums the output signal of the rotor flux estimating portion 6 and the normal flux value φdr* to obtain the d axis current command value. A fourth PI controller 9 proportionally and integrally controls the output value e4 obtained by a summer G4 which sums the output signal of the third PI controller 7 and the d axis current signal outputted from the rotor flux estimating portion 6 and controls the d axis current command value.

A slip resistance calculator 13 receives the output of the rotor resistance estimating portion 15 and the output of a divider 12 which divides the q axis current iqs outputted from the current phase converter 4 by the output value of the rotor flux estimating portion 6.

The rotor resistance estimating portion 15 receives the synchronous angular velocity Ws from a summer 14 which sums the output (slip angular velocity Ws1) of the slip resistance calculator 13 and the present velocity value Wr outputted from a counter 3 which will be described later. The rotor resistance estimating portion 15 also receives the normal velocity command value Wr*, the normal flux command value φdr*, the output signal of the slip resistance calculator 13 and the output signals U1 and U2 of the second and fourth PI controllers 8 and 9 so as to estimate the variation of the rotor resistance. Further, a ROM table 18 converts an axis fixed to the stator axis into the d-q axis rotated with the arbitrarily synchronous angular velocity and also converts the d-q axis velocity into the axis fixed to the stator axis by using the output signal of an integrator 17 which integrates the output signal (the synchronous angular velocity Ws of the summer 14) as an address so as to obtain the value sinθ and cosθ. A controller 16 receives the output signals U1 and U2 of the second and fourth PI controllers 8 and 9 and separately controls the flex and velocity of the rotor so as to product the stator voltages Vds and Vqs.

A 2φ-3φ converter 19 converts the output signals Vds and Vqs of the controller 16 into the phase voltage command values Vas and Vbs of the motor 1 in accordance with the values sinθ and cosθ produced at the ROM table 18. The phase voltage command values Vas and Vbs are input to inverting terminals (−) of comparators 21a and 21b in a comparing portion 21 through digital to analog converters D/A1 and D/A2, respectively.

At an inverting terminal (−) of a comparator 21c in the comparing portion 21, the phase voltage command value obtained by the analog values from the D/A converters D/A1 and D/A2 being summed by a summer G5 and then inverted by an inverter IN1 is supplied while at non-inverting terminals of the comparators 21a, 21b and 21c, a triangular wave produced by a triangular wave generator 20 is supplied.

A pulse width modulation signal generator 22 receives the output signals of the comparators 21a, 21b and 21c and modulates the input signals to signals each having a predetermined pulse width so as to supply six kinds of modulated output signals to the inverter 23 to thereby control the current to be supplied to the induction motor 1.

The counter 3 counts the output waveform of the pulse generator 2 which generates pulses proportional to the number of revolutions of the motor 1 for a predetermined velocity value Wr to the summers G1 and 14. The control signal for the motor 1 corresponding to 1φ-2φ current of the output signals of the inverter 23 is digitized by the A/D. The converters A/D1 and A/D2 digitized signals then enter to the current phase (3φ-2φ) converter 4. The output signals of the A/D converters A/D1 and A/D2 are summed by a summer G6 and the summed signal is inverted by the inverter IN2. Then, the inverted signal is supplied to the 3φ-2φ converter 4.

Now, the operation of the control circuit for the induction motor as constructed above will be described.

Referring to FIG. 2, the dynamic equation of the induction motor 1 on the d-q axes rotating with an arbitrarily synchronous velocity Ws can generally be expressed as below.

$$ids \text{ (the d-axis stator current)} = -a1\ ids + Ws\ iqs + a2\phi dr + P\ a3Wr\ \phi qr + C\ Vds$$

$$iqs \text{ (the q-axis stator current)} = -Ws\ ids - a1\ iqs - P\ a3Wr\ \phi dr + a2\ \phi qr + C\ Vqs$$

$$\phi dr \text{ (the d-axis rotor current)} = -a4\ \phi dr + a5\ ids + (Ws - Pwr)\ \phi qr$$

$$\phi qr \text{ (the q-axis rotor current)} = -a4\ \phi qr + a5\ iqs - (Ws - PWr)\ \phi dr$$

$$Wr \text{ (the rotor velocity)} = -[bwr + Kt\,(\phi dr\,iqs - \phi qr\,ids) - Tl]/J \quad [1]$$

where, P denotes the maximum value, J denotes an inertial moment, b denotes a damping factor, Rs and Rr denote the stator and rotor resistances, Ls and Lr denote the stator and rotor mutual inductances, Tl denotes a load torque, $a1 = c(Rs + M^2\,Rr/Lr^2)$, $a2 = CM\,Rr/Lr^2$, $a3 = CM/Lr$, $a4 = Rr/Lr$, $a5 = M \cdot Rr/Lr$, $Kt = 3/2 \cdot P/2 \cdot M/Lr$.

In case of the vector control, an arbitrarily synchronous velocity Ws can be expressed as follows. That is:

$$Ws = PWr + a5\,iqs/\phi dr \quad [2]$$

The flux of the rotor can be estimated by the following equation.

$$\phi dr = -a4\,\phi dr + a5\,ids \quad [3]$$

When the vector control is effected by using the equations [2] and [3], the rotor current of the q axis in the equation [1] is set to be 0. As the resistance Rr of the rotor is changed, the flux of the rotor estimated by the equation [3] is different from the actual flux of the rotor and, consequently, the rotor current $\phi qr$ of the q axis is not set to be 0. This can be prevented by correctly estimating the resistance of the rotor.

In this case, the following equations can be defined to estimate the resistance of the rotor.

$$P = -a5\,Ws^s\,(\phi dr^s\,ids^s + \phi qr^s\,iqs^s)/Rr$$

$$P = -a5\,Ws^s\,(\phi dr^* \,ids^s/Rr \quad [4]$$

Where, s denotes a normal state, and $\phi dr^*$ denotes the rotor flux command value.

Assuming that the resistance of the rotor before changing is Rr, the quadratic equation can be defined as follows.

$$(\Delta Rr/Lr)^2 2a4\,(\Delta Rr/Lr) - Ko = 0 \quad [5]$$

where, $a4 = Rr/Lr$, $Rr - Rr$ is defined as $\Delta Rr$. Also, $$K_0 = -K_1\,K_2\,(1 + K_1)$$

$$K_1 = \Delta P\,|RV|^2/Lr\,Ws^s\,|Ws1^s\,\phi dr^*|^2$$

$$K_2 = a4|^2 + |Ws1^s|^2 \quad [6]$$

where $\Delta P = P - P^*$, $Ws1^s = A5\,iqs^s/\phi dr^s$.

From the equation [5], the following equation can be established.

$$\Delta Rr = -Rr\sqrt{|Rr|^2 + L|Lr|^2 Ko} \quad [7]$$

In order to solve the equation [7], it is necessary to estimate the value $\Delta P$. Accordingly, if the terms Vds and Vqs are removed as follows:

$$\begin{bmatrix} Vds \\ Vqs \end{bmatrix} = \begin{bmatrix} -WSiqs/c + U_1 \\ PWr(ids + a3\phi dr) + U_2/\phi dr \end{bmatrix} \quad [8]$$

then $\Delta P$ can be defined as follows.

$$\Delta P = U_1\,iqs^s - U_2/M + LsWs^sl\,|ids^s|^2 \quad [9]$$

In the equation [9], $\Delta P$ can be calculated by known values, and the changed amount of the rotor resistance in the equation [7] can be obtained.

Now, the operation of the control circuit according to the present invention will be described with reference to the equations.

The normal velocity command value Wr* and normal flux command value $\phi dr^*$ for the rotor are input to the summers G1 and G2 respectively. The output of the pulse generator which generates the pulses proportional to the number of revolutions of the motor 1 is counted by the counter 3 to obtain the present velocity Wr of the motor 1. The present velocity Wr is also fed back to the summers G1 and G2. Accordingly, the summer G1 sums the input command values Wr* and the velocity value Wr and the summer G2 sums the input command value $\phi dr^*$ and the flux value $\phi dr$. The summed output e1 of the summer G1 is supplied to the first PI controller 5 which proportionally and integrally controls the input values Wr*. The second PI controller 8 proportionally and integrally controls the output signal of the summer G3 which sums the motor torque output, obtained by multiplying the flux $\phi dr$ and the q-axis current iqs from the rotor flux estimating portion 6 by the multiplier 6, and the output signal of the first PI controller 5. Consequently, the second PI controller 8 produces the motor torque control value U1 to be supplied to the controller 16.

The rotor flux estimating portion 6 receives the d-axis current ids from the 3$\phi$-2$\phi$ current phase converter 4 which converts a three-phase current of the motor 1 into d-q axis currents ids and iqs, and then estimates the flux of the rotor, which can be obtained by the equation [3]. More specifically, when a laplace transform is applied to the term "$\phi dr = -a4\phi dr + a5\,ids$", the result obtained is $(s + a4)\,dr(s) = a5\,Ids(s)$ (where, flux$\Phi dr(s)/\Phi Ids(s)$ is $a5/s + a4$).

As mentioned above, the flux value $\phi dr$ estimated by the rotor flux estimating portion 6 is input to the summer G2 which sums it with the normal flux command value $\phi dr^*$. Next, the output e3 of the summer G2 is supplied to the third PI controller 7 which effects PI control so as to produce the d-axis current command value. The fourth PI controller 9 receives the output e4 of the summer G4 which sums the d-axis current ids and the d-axis current supplied from the third PI controller 7, and proportionally and integrally controls the output e4 so as to obtain the output value U2 which, in turn, is supplied to the controller 16.

The controller 16 receives the motor torque control value from the second PI controller 8 and the d-axis current control value from the fourth PI controller 9 and produces the d-q axis stator voltages Vds and Vqs through an internal program. The voltages Vds and Vqs are controlled by the values $\sin\theta$ and $\cos\theta$ defined by the ROM table 18 and are supplied to the 2$\phi$-3$\phi$ phase converter 19. As a result, the motor phase voltage command values Vas and Vbs, are D/A converted by the D/A converters D/A1 and D/A2. The converted analog values are supplied to the inverting terminals of the comparators 21a and 21b in the comparing portion 21. At the non-inverting terminals of the comparators 21a and 21b a triangular wave is supplied from the triangular wave generator 20. Consequently, the comparing portion 21 outputs the difference between the analog value and the triangular wave. The difference value are input to the pulse width modulation signal generator 22.

The output signals of the D/A converters D/A1 and D/A2 are supplied to the summer G5 and the summed result is input to inverted by the inverter IN1. The inverted output is the inverting terminal of the comparator 21c which receives at the non-inverting terminal the triangular wave from the triangular wave generator 20.

Accordingly, the comparator 21c produces the difference between the input signals which are supplied to the pulse width modulation signal generator 22.

The pulse width modulation signal generator 22 receives the output signals of the comparators 21a, 21b and 21c and modulates the pulse width to control the rotating velocity of the motor 1 through the inverter portion 23 which drives the motor 1.

Further, the slip resistance calculator 13 obtains the slip resistance (i.e., slip angular velocity Wsl) by the following equation on the basis of the output of the divider 12 and the resistance Rr estimated by the rotor resistance estimating portion 15. That is:

$$Wsl = a5 = M\ Rr^*/Lr$$

In this case, the output of divider 12 can be defined by the flux value $\phi dr$ from the rotor flux estimating portion 6 and the q-axis current value.

The slip angular velocity Wsl obtained by the slip resistance calculator 13 and the present velocity Wr from the counter 3 are summed by the summer 14 so as to produce the synchronous angular velocity Ws. This velocity Ws is integrated by the integrator 17 and the integrator output of the integrator 17 is then supplied to the ROM table 18 as an address signal. Therefore, the d-q axis current of the three-phase/two-phase current converter 4 can be compensated by using the values $\sin\theta$ and $\cos\theta$ from the ROM table 18 and the two-phase/three-phase current converter 19 calculate the motor phase voltage command Vas and Vbs.

The rotor resistance estimating portion 15 receives the slip angular velocity Wsl and synchronous angular velocity Ws, the normal velocity command value Wr*, the normal flux command value $\phi dr^*$, the torque control value U1 supplied from the second PI controller 8 and the d-axis current control value U2 supplied from the fourth PI controller 9 and estimates the variation of the resistance of the rotor which is obtained by the following equation.

$$Rr^* = Rr + \Delta Rr = \sqrt{|Rr|^2 + |Lr|^2 Ko}$$

The estimated resistance of the rotor is supplied to the rotor flux estimating portion 6 and the slip resistance calculator 13 to automatically control those elements so as to correctly estimate the flux and slip resistance of the rotor.

According to the present invention operated as described above, since the changed amount of the rotor resistance is calculated by using a quadratic equation related to the variation of the resistance, and the calculated rotor resistance is substituted by a new resistance value to compensate for the resistance of the rotor changed due to the temperature and environment the vector control can be achieved for the induction motor.

What is claimed is:

1. A control apparatus for an induction motor, said apparatus comprising:

means, for receiving currents based on three phase current of the induction motor and a rotor resistance estimate, for estimating a rotor flux of the induction motor;

means for detecting a rotating velocity of the induction motor;

means, for receiving said rotor flux estimate, said rotating velocity, a predetermined normal velocity command value, and a predetermined normal flux command value, for proportionally and integrally controlling a plurality of control values, said control values being based on said rotor flux estimate or said rotating velocity, for generating control signals, wherein said proportionally and integrally controlling means includes, first proportional and integral control means for generating a first control value based on said rotating velocity and said normal velocity command value;

second proportional and integral control means for generating a first control signal based on said first control value and said rotor flux estimate;

third proportional and integral control means for generating a second control value based on said rotor flux estimate and said normal flux command vale; and fourth proportional and integral control means for generating a second control signal based on said second control value;

means, for receiving said control signals, a slip angular velocity and a synchronous angular velocity, for generating said rotor resistance estimate;

means, for receiving said rotor resistance estimate and said rotor flux estimate, for calculating said slip angular velocity indicative of slip resistance, for calculating said synchronous angular velocity;

means, for receiving said control signal, for controlling a flux and velocity of said rotor by producing stator control values;

means for converting said stator control values to phase command values based on an integrated value of said synchronous angular velocity; and means for driving the induction motor according to said phase command values.

* * * * *